United States Patent
Li et al.

(10) Patent No.: US 12,052,187 B2
(45) Date of Patent: Jul. 30, 2024

(54) SYSTEMS, METHODS, AND DEVICES FOR SECONDARY CELL ACTIVATION WITH UE-SPECIFIC REFERENCE SIGNAL

(71) Applicant: Apple Inc., Cupertino, CA (US)

(72) Inventors: Qiming Li, Beijing (CN); Dawei Zhang, Saratoga, CA (US); Huaning Niu, Cupertino, CA (US); Jie Cui, San Jose, CA (US); Manasa Raghavan, Sunnyvale, CA (US); Xiang Chen, Saratoga, CA (US); Yang Tang, San Jose, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/441,068

(22) PCT Filed: Jan. 14, 2021

(86) PCT No.: PCT/CN2021/071807
§ 371 (c)(1),
(2) Date: Sep. 20, 2021

(87) PCT Pub. No.: WO2022/151173
PCT Pub. Date: Jul. 21, 2022

(65) Prior Publication Data
US 2023/0370217 A1    Nov. 16, 2023

(51) Int. Cl.
*H04L 5/00* (2006.01)

(52) U.S. Cl.
CPC .......... *H04L 5/0035* (2013.01); *H04L 5/0048* (2013.01); *H04L 5/0098* (2013.01)

(58) Field of Classification Search
None
See application file for complete search history.

(56) References Cited

U.S. PATENT DOCUMENTS 11,533,149 B2 * 12/2022 Hsieh .................... H04L 5/0098
11,622,239 B2 *  4/2023 Liu ......................... H04W 4/06
                                                                     370/312
(Continued)

FOREIGN PATENT DOCUMENTS

| CN | 111385078 A | 7/2020 |
| CN | 111934837 A | 11/2020 |
| WO | 2019214663 A1 | 11/2019 |

OTHER PUBLICATIONS

CATT; "Discussion on efficient activation and de-activation mechanism for SCell in NR CA"; 3GPP TSG RAN WG1 #103-e; R1-2007841; Nov. 13, 2020.

(Continued)

*Primary Examiner* — Faiyazkhan Ghafoerkhan
(74) *Attorney, Agent, or Firm* — Eschweiler & Potashnik, LLC (57) ABSTRACT

Techniques discussed herein may better ensure efficient fine time tracking during a second cell (SCell) activation procedure by using a tracking reference signal (TRS) that is User Equipment (UE) specific. A primary cell (PCell) may provide a UE with a TRS configuration that includes a UE-specific reference signal (RS) with periodicity or aperiodicity. In response to receiving a SCell activation command from the PCell, the UE may perform cell activation with fine time tracking in accordance with the UE-specific RS. As the delay time for the UE-specific RS may be less than the delay time for a system synchronization block (SSB) from the SCell, use of the UE-specific RS may expedite the cell activation procedure.

18 Claims, 6 Drawing Sheets

(56) References Cited

U.S. PATENT DOCUMENTS

| | | | | |
|---|---|---|---|---|
| 2015/0341877 A1* | 11/2015 | Yi | ........................ | H04W 56/001 |
| | | | | 370/350 |
| 2015/0358094 A1* | 12/2015 | Yi | ........................ | H04W 72/54 |
| | | | | 370/252 |
| 2019/0356444 A1* | 11/2019 | Noh | ........................ | H04L 5/0023 |
| 2021/0136532 A1* | 5/2021 | Liu | ........................ | H04W 48/10 |
| 2021/0359812 A1* | 11/2021 | Bai | ........................ | H04L 5/0091 |
| 2022/0116896 A1* | 4/2022 | Takeda | .................. | H04L 5/0048 |
| 2022/0116924 A1* | 4/2022 | Takeda | .................. | H04L 5/0098 |
| 2022/0225183 A1* | 7/2022 | Takeda | .................. | H04L 5/0055 |
| 2022/0271899 A1* | 8/2022 | Hsieh | .................... | H04W 72/20 |
| 2023/0370217 A1* | 11/2023 | Li | ........................ | H04L 5/0098 |

OTHER PUBLICATIONS

PCT Search Report dated Oct. 9, 2021 in connection with PCT Application No. PCT/CN2021/071807.
PCT Written Opinion dated Oct. 9, 2021 in connection with PCT Application No. PCT/CN2021/071807.
International Report on Patentability dated Jul. 4, 2023 in connection with PCT Application No. PCT/CN2021/071807.

* cited by examiner

SYSTEMS, METHODS, AND DEVICES FOR SECONDARY CELL ACTIVATION WITH UE-SPECIFIC REFERENCE SIGNAL

REFERENCE TO RELATED APPLICATIONS

This application is a National Phase entry application of International Patent Application No. PCT/CN2021/071807 filed Jan. 14, 2021, entitled "SYSTEMS, METHODS AND DEVICES, FOR SECONDARY CELL ACTIVATION WITH UE-SPECIFIC REFERENCE SIGNAL", the contents of which are herein incorporated by reference in their entirety.

FIELD

This disclosure relates to wireless communication networks including techniques for secondary cell activation in a wireless communication network. Other aspects and techniques are also described.

BACKGROUND

As the number of mobile devices within wireless networks, and the demand for mobile data traffic, continue to increase, changes are made to system requirements and architectures to better address current and anticipated demands. An aspect of such networks may include carrier aggregation (CA) and radio resource management (RRM). For example, the base station of a primary cell may cause a user equipment (UE) to active communications with the base station of a secondary cell, resulting in a CA scenario for the UE involving the primary and secondary cell.

BRIEF DESCRIPTION OF THE DRAWINGS

The present disclosure will be readily understood and enabled by the detailed description and accompanying figures of the drawings. Like reference numerals may designate like features and structural elements. Figures and corresponding descriptions are provided as non-limiting examples of aspects, implementations, etc., of the present disclosure, and references to "an" or "one" aspect, implementation, etc., may not necessarily refer to the same aspect, implementation, etc., and may mean at least one, one or more, etc.

DETAILED DESCRIPTION

The following detailed description refers to the accompanying drawings. Like reference numbers in different drawings may identify the same or similar features, elements, operations, etc. Additionally, the present disclosure is not limited to the following description as other implementations may be utilized, and structural or logical changes made, without departing from the scope of the present disclosure.

Mobile communication networks may include one or more types and/or generations of wireless communication networks, such as 4th generation (4G) networks, 5th generation (5G) or new radio (NR) networks, etc. Such networks may include user equipment (UEs) and base stations. An aspect of mobile communication networks includes radio resource management (RMM), which may include configuration, assignment, allocation, management, etc., of wireless resources (e.g., channels, bandwidths, carriers, etc.) within the network. For example, carrier aggregation (CA) may include a scenario in which multiple carriers are allocated to a UE. In some scenarios, CA may involve carriers aggregated from different base stations.

For example, a UE may connect to a first carrier on a first base station operating as a primary cell (PCell) for purposes of RRM, CA, etc., regarding the UE. The primary cell may perform a radio resource control (RRC) connection reconfiguration procedure that includes sending the UE connection configuration information and an activation command regarding a second carrier of the first base station or a third carrier on a second base station that may operate as a secondary cell (SCell). The UE may respond to the configuration information and command by searching for, and connecting to, the SCell, resulting in a CA scenario involving the PCell, SCell, and UE.

To connect to the SCell, the UE may perform timing synchronization, which may include course timing synchronization and fine timing synchronization (also referred to herein as fine time tracking). Course timing synchronization may generate an initial estimate of a starting index or symbol for communicating with the SCell, and fine time tracking may improve the initial estimate toward an ideal or more accurate starting point regarding communications with the SCell. Because timing synchronization may be performed prior to the completion of SCell activation, the duration of time involved in SCell activation may depend, at least in part, on the time involved in fine time tracking. Further, since timing synchronization may depend on a reference signal (RS) of signal synchronization blocks (SSBs) from the SCell, SCell activation time (or activation delay) may depend on SSBs periodicity of the SCell.

For example, the SCell activation delay may include a duration of time between an end of a first complete SSB burst indicated by an SSB-based RRM measurement timing configuration (SMTC) after slot n+time for a hybrid automatic repeat request (Time_HARQ)+3 ms, where n is a time when the UE receives the media access control (MAC) command including a SCell activation command, Time_HARQ is a duration of time associated with a HARQ message corresponding to the MAC command, and an NR slot length is a designated slot length for performing fine time tracking during the TRS. In another example, the SCell activation delay may be further extended by an RS time (Trs) indicated by the SMTC, provided by a measurement object, or a default duration. In yet another example, SCell activation delay may include a duration between the UE finishing the processing a last activation command for a physical downlink control channel (PDCCH) transmission configuration indicator (TCI), physical downlink shared channel (PDSCH) TCI (when applicable) and the timing of first complete available SSB corresponding to the TCI state. As such, the activation time for SCells may be long because RSs used for synchronization may depend on SSB periodicity of the SCell (e.g., 160 milliseconds) and other durations that may sometimes be involved. These durations, in turn, delay SCell activation and CA.

The techniques described herein may increase SCell activation efficiency by implementing a UE-specific RS for fine time tracking instead of a cell-specific RS (e.g., via SSBs). The UE-specific RS may be configured with either a short periodicity (e.g., a shorter periodicity than the SSB periodicity of the SCell) or aperiodicity that occurs well within the SSB periodicity of the SCell. In some implementations, a UE-specific RS for fine time tracking during a SCell activation procedure may be a tracking reference signal (TRS). The network (e.g., PCell) may configure the TRS via RRC messaging (e.g., via an RRC connection configuration procedure, RRC connection reconfiguration procedure, etc.) containing a SCell addition.

Later, the PCell may send the UE a media access control (MAC) control element that includes a SCell activation command In response, the UE may perform a cell search procedure for SCell and automatic gain control (AGC) adjustment. Additionally, the UE may use the TRS to promptly perform fine timing tracking and/or AGC (e.g., well-before the reception and processing of the next SSB from the SCell) and proceed to expeditiously complete the SCell activation procedure.

In some implementations, the TRS of SCell may be periodic or aperiodic. When the TRS is periodic, the delay for fine time tracking and/or ACG may be based on the TRS periodicity. When the TRS is aperiodic, the delay for fine time tracking and/or ACG may depending on network scheduling (e.g., when to trigger the TRS transmission). In some implementations, the aperiodic TRS may be transmitted shortly after the PCell transmits the SCell activation command to the UE. In some implementations, the aperiodic TRS may be triggered by the network (e.g., PCell) via downlink control information (DCI) and/or a MAC command, which may be communicated after sending the SCell activation command to the UE. When TCI is configured by the network, the TRS may be transmitted after the UE successfully decodes a TCI command from the PCell. When TCI is not configured, the TRS may be transmitted after the UE receives the MAC CE with the SCell activation command. For example, the TRS may be transmitted at slot n+(Time_HARQ+3 ms)/(NR slot length), where n is a time when UE receives the MAC CE, Time_HARQ is a time associated with a HARQ message for the MAC CE, and new radio (NR) slot length is a designated slot length for performing fine time tracking during the TRS.

In some implementations, Time_FineTiming may include a duration of time between the UE finishing with processing a last activation command for PDCCH TCI, PDSCH TCI (when applicable) and of either: 1) a first complete available SSB corresponding to the TCI state when the TRS is not configured, or a first complete available TRS occasion with the same TCI state when the TRS is configured. Alternatively, when the TRS is configured, the Time_FineTiming may be further splitter into two cases, periodic and aperiodic. When a periodic TRS is configured, Time_FineTiming may be a periodicity of the TRS. When aperiodic TRS is configured, Time_FineTiming may be a duration of time between the UE finishing with processing a last activation command for PDCCH TCI, PDSCH TCI (when applicable) and a timing of a first complete available TRS occasion with the same TCI state if TRS is configured.

In some implementations, regarding RRM conditions for fine time tracking during SCell activation, Time_FirstSSB may be a duration of time from an end of a first complete SSB burst indicated by an SMTC after slot n+Time_HARQ+3 ms, when SMTC is configured on target SCell, or when TRS is configured, Time_FirstSSB may be a duration of time to an end of the first complete available TRS occasion (if configured, with the same TCI state) after n+Time_HARQ +3 ms. In either scenario, Time_FirstSSB_MAX may be a time to an end of a first complete available TRS occasion (if configured, with the same TCI state) after slot n+Time_HARQ +3 m.

Alternatively, when TRS is configured, RRM conditions may be further splintered into two cases, periodic and aperiodic. When periodic TRS is configured, Time_FirstSSB may be equal to Time_TRS, and Time_FirstSSB_MAX may be equal to Time_PRS, where Time_PRS is the periodicity of PRS. When aperiodic TRS is configured, Time_FirstSSB and Time_FirstSSB_MAX are a duration of time between the UE finishing processing a SCell activation command and the timing of first complete available TRS occasion (if configured, with the same TCI state).

Figure 1:
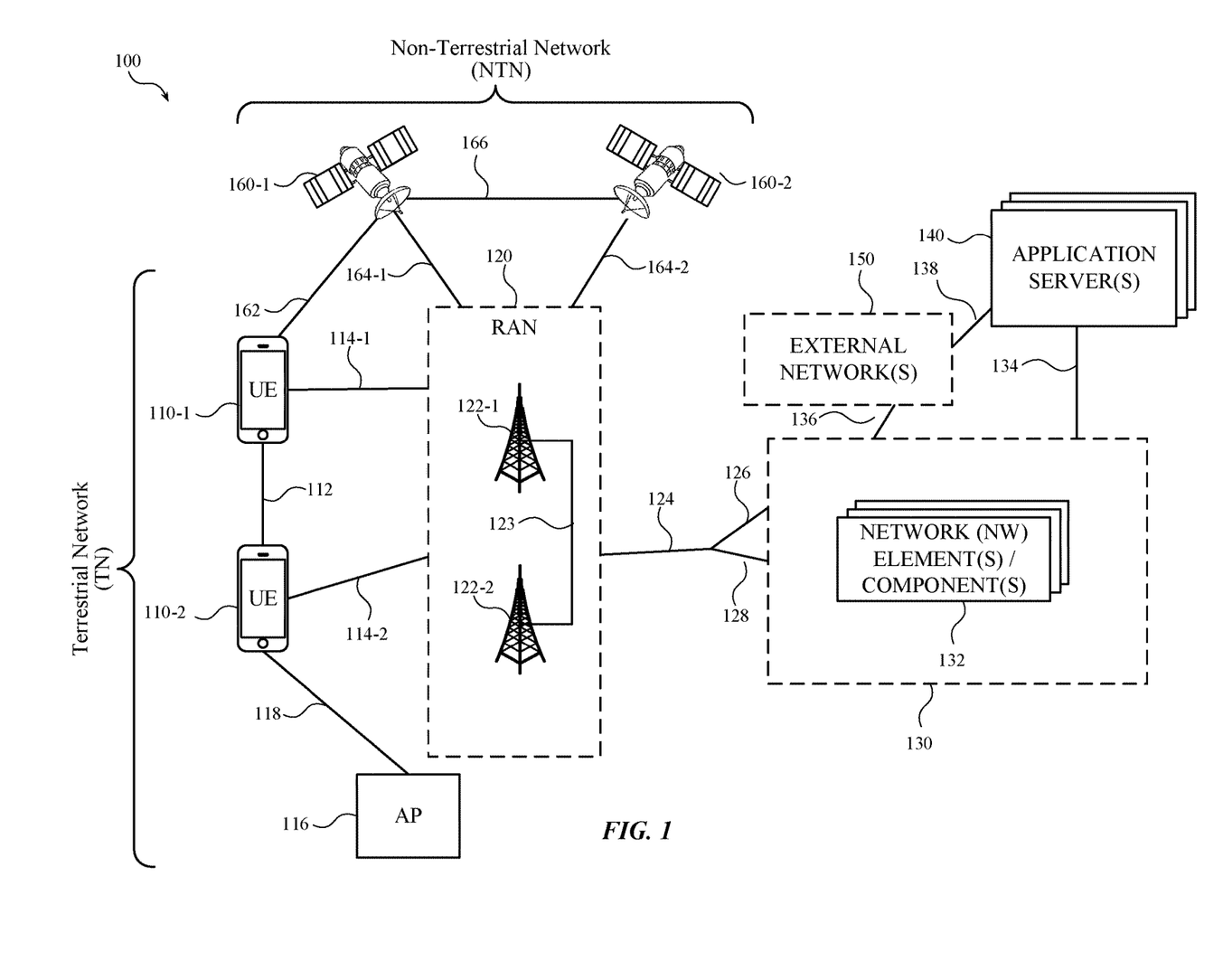
FIG. 1 is a diagram of an example network according to one or more implementations described herein.

FIG. 1 is an example network 100 according to one or more implementations described herein. Example network 100 may include UEs 110-1, 110-2, etc. (referred to collectively as "UEs 110" and individually as "UE 110"), a radio access network (RAN) 120, a core network (CN) 130, application servers 140, external networks 150, and satellites 160-1, 160-2, etc. (referred to collectively as "satellites 160" and individually as "satellite 160"). As shown, network 60 may include a non-terrestrial network (NTN) comprising one or more satellites 160 (e.g., of a global navigation satellite system (GNSS)) in communication with UEs 110 and RAN 120.

The systems and devices of example network 100 may operate in accordance with one or more communication standards, such as 2nd generation (2G), 3rd generation (3G), 4th generation (4G) (e.g., long-term evolution (LTE)), and/or 5th generation (5G) (e.g., new radio (NR)) communication standards of the 3rd generation partnership project (3GPP). Additionally, or alternatively, one or more of the systems and devices of example network 100 may operate in accordance with other communication standards and protocols discussed herein, including future versions or generations of 3GPP standards (e.g., sixth generation (6G) standards, seventh generation (7G) standards, etc.), institute of electrical and electronics engineers (IEEE) standards (e.g., wireless metropolitan area network (WMAN), worldwide interoperability for microwave access (WiMAX), etc.), and more.

As shown, UEs 110 may include smartphones (e.g., handheld touchscreen mobile computing devices connectable to one or more wireless communication networks). Additionally, or alternatively, UEs 110 may include other types of mobile or non-mobile computing devices capable of wireless communications, such as personal data assistants (PDAs), pagers, laptop computers, desktop computers, wireless handsets, etc. In some implementations, UEs 110 may include internet of things (IoT) devices (or IoT UEs) that may comprise a network access layer designed for low-power IoT applications utilizing short-lived UE connections. Additionally, or alternatively, an IoT UE may utilize one or more types of technologies, such as machine-to-machine (M2M) communications or machine-type communications (MTC) (e.g., to exchanging data with an MTC server or other device via a public land mobile network (PLMN)), proximity-based service (ProSe) or device-to-device (D2D) communications, sensor networks, IoT networks, and more. Depending on the scenario, an M2M or MTC exchange of data may be a machine-initiated exchange, and an IoT network may include interconnecting IoT UEs (which may include uniquely identifiable embedded computing devices within an Internet infrastructure) with short-lived connections. In some scenarios, IoT UEs may execute background applications (e.g., keep-alive messages, status updates, etc.) to facilitate the connections of the IoT network.

UEs 110 may communicate and establish a connection with (e.g., be communicatively coupled) with RAN 120, which may involve one or more wireless channels 114-1 and 114-2, each of which may comprise a physical communications interface/layer. In some implementations, a UE may be configured with dual connectivity (DC) as a multi-radio access technology (multi-RAT) or multi-radio dual connectivity (MR-DC), where a multiple receive and transmit (Rx/Tx) capable UE may use resources provided by different network nodes (e.g., 122-1 and 122-2) that may be connected via non-ideal backhaul (e.g., where one network node provides NR access and the other network node provides either E-UTRA for LTE or NR access for 5G). In such a scenario, one network node may operate as a master node (MN) and the other as the secondary node (SN). The MN and SN may be connected via a network interface, and at least the MN may be connected to the CN 130. Additionally, at least one of the MN or the SN may be operated with a shared spectrum channel access, and functions specified for UE 110 can be used for an integrated access and backhaul mobile termination (IAB-MT). Similar for UE 61, the IAB-MT may access the network using either one network node or using two different nodes with enhanced dual connectivity (EN-DC) architectures, new radio dual connectivity (NR-DC) architectures, or the like.

As shown, UE 110 may also, or alternatively, connect to access point (AP) 116 via interface 118, which may include an air interface enabling UE 110 to communicatively couple with AP 116. AP 116 may comprise a wireless local area network (WLAN), WLAN node, WLAN termination point, etc. The connection 1207 may comprise a local wireless connection, such as a connection consistent with any IEEE 702.11 protocol, and AP 116 may comprise a wireless fidelity (Wi-Fi®) router or other AP. While not explicitly depicted in FIG. 1, AP 116 may be connected to another network (e.g., the Internet) without connecting to RAN 120 or CN 130. In some scenarios, UE 110, RAN 120, and AP 116 may be configured to utilize LTE-WLAN aggregation (LWA) techniques or LTE WLAN radio level integration with IPsec tunnel (LWIP) techniques. LWA may involve UE 110 in RRC_CONNECTED being configured by RAN 120 to utilize radio resources of LTE and WLAN. LWIP may involve UE 110 using WLAN radio resources (e.g., connection interface 118) via IPsec protocol tunneling to authenticate and encrypt packets (e.g., Internet Protocol (IP) packets) communicated via connection interface 118. IPsec tunneling may include encapsulating the entirety of original IP packets and adding a new packet header, thereby protecting the original header of the IP packets.

RAN 120 may include one or more RAN nodes 122-1 and 122-2 (referred to collectively as RAN nodes 122, and individually as RAN node 122) that enable the connections 114-1 and 114-2 to be established between UEs 110 and RAN 120. RAN node 122 may also, or alternatively, referred to herein as a base station. RAN nodes 122 may include network access points configured to provide radio baseband functions for data and/or voice connectivity between users and the network based on one or more of the communication technologies described herein (e.g., 2G, 3G, 4G, 5G, WiFi, etc.). As examples therefore, a RAN node may be an E-UTRAN Node B (e.g., an enhanced Node B, eNodeB, eNB, 4G base station, etc.), a next generation base station (e.g., a 5G base station, NR base station, next generation eNBs (gNB), etc.). RAN nodes 122 may include a roadside unit (RSU), a transmission reception point (TRxP or TRP), and one or more other types of ground stations (e.g., terrestrial access points). In some scenarios, RAN node 122 may be a dedicated physical device, such as a macrocell base station, and/or a low power (LP) base station for providing femtocells, picocells or other like having smaller coverage areas, smaller user capacity, or higher bandwidth compared to macrocells. As described below, in some implementations, satellites 160 may operate as bases stations (e.g., RAN nodes 122) with respect to UEs 110. As such, references herein to a base station, RAN node 122, etc., may involve implementations where the base station, RAN node 122, etc., is a terrestrial network node and also to implementation where the base station, RAN node 122, etc., is a non-terrestrial network node (e.g., satellite 160).

Some or all of RAN nodes 122 may be implemented as one or more software entities running on server computers as part of a virtual network, which may be referred to as a centralized RAN (CRAN) and/or a virtual baseband unit pool (vBBUP). In these implementations, the CRAN or vBBUP may implement a RAN function split, such as a packet data convergence protocol (PDCP) split wherein radio resource control (RRC) and PDCP layers may be operated by the CRAN/vBBUP and other Layer 2 (L2) protocol entities may be operated by individual RAN nodes 122; a media access control (MAC)/physical (PHY) layer split wherein RRC, PDCP, radio link control (RLC), and MAC layers may be operated by the CRAN/vBBUP and the PHY layer may be operated by individual RAN nodes 122; or a "lower PHY" split wherein RRC, PDCP, RLC, MAC layers and upper portions of the PHY layer may be operated by the CRAN/vBBUP and lower portions of the PHY layer may be operated by individual RAN nodes 122. This virtualized framework may allow freed-up processor cores of RAN nodes 122 to perform or execute other virtualized applications.

In some implementations, an individual RAN node 122 may represent individual gNB-distributed units (DUs) connected to a gNB-control unit (CU) via individual F1 interfaces. In such implementations, the gNB-DUs may include one or more remote radio heads or radio frequency (RF) front end modules (RFEMs), and the gNB-CU may be operated by a server (not shown) located in RAN 120 or by a server pool (e.g., a group of servers configured to share resources) in a similar manner as the CRAN/vBBUP. Additionally, or alternatively, one or more of RAN nodes 122 may be next generation eNBs (i.e., gNBs) that may provide evolved universal terrestrial radio access (E-UTRA) user plane and control plane protocol terminations toward UEs 110, and that may be connected to a 5G core network (5GC) 130 via an NG interface.

Any of the RAN nodes 122 may terminate an air interface protocol and may be the first point of contact for UEs 110. In some implementations, any of the RAN nodes 122 may fulfill various logical functions for the RAN 120 including, but not limited to, radio network controller (RNC) functions such as radio bearer management, uplink and downlink dynamic radio resource management and data packet scheduling, and mobility management. UEs 110 may be configured to communicate using orthogonal frequency-division multiplexing (OFDM) communication signals with each other or with any of the RAN nodes 122 over a multicarrier communication channel in accordance with various communication techniques, such as, but not limited to, an OFDMA communication technique (e.g., for downlink communications) or a single carrier frequency-division multiple access (SC-FDMA) communication technique (e.g., for uplink and ProSe or sidelink (SL) communications), although the scope of such implementations may not be limited in this regard. The OFDM signals may comprise a plurality of orthogonal subcarriers.

In some implementations, a downlink resource grid may be used for downlink transmissions from any of the RAN nodes 122 to UEs 110, and uplink transmissions may utilize similar techniques. The grid may be a time-frequency grid (e.g., a resource grid or time-frequency resource grid) that represents the physical resource for downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises resource blocks, which describe the mapping of certain physical channels to resource elements. Each resource block may comprise a collection of resource elements (REs); in the frequency domain, this may represent the smallest quantity of resources that currently may be allocated. There are several different physical downlink channels that are conveyed using such resource blocks.

Further, RAN nodes 122 may be configured to wirelessly communicate with UEs 110, and/or one another, over a licensed medium (also referred to as the "licensed spectrum" and/or the "licensed band"), an unlicensed shared medium (also referred to as the "unlicensed spectrum" and/or the "unlicensed band"), or combination thereof. A licensed spectrum may include channels that operate in the frequency range of approximately 400 MHz to approximately 3.8 GHz, whereas the unlicensed spectrum may include the 5 GHz band. A licensed spectrum may correspond to channels or frequency bands selected, reserved, regulated, etc., for certain types of wireless activity (e.g., wireless telecommunication network activity), whereas an unlicensed spectrum may correspond to one or more frequency bands that are not restricted for certain types of wireless activity. Whether a particular frequency band corresponds to a licensed medium or an unlicensed medium may depend on one or more factors, such as frequency allocations determined by a public-sector organization (e.g., a government agency, regulatory body, etc.) or frequency allocations determined by a private-sector organization involved in developing wireless communication standards and protocols, etc.

To operate in the unlicensed spectrum, UEs 110 and the RAN nodes 122 may operate using licensed assisted access (LAA), eLAA, and/or feLAA mechanisms. In these implementations, UEs 110 and the RAN nodes 122 may perform one or more known medium-sensing operations or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

The LAA mechanisms may be built upon carrier aggregation (CA) technologies of LTE-Advanced systems. In CA, each aggregated carrier is referred to as a component carrier (CC). In some cases, individual CCs may have a different bandwidth than other CCs. In time division duplex (TDD) systems, the number of CCs as well as the bandwidths of each CC may be the same for DL and UL. CA also comprises individual serving cells to provide individual CCs. The coverage of the serving cells may differ, for example, because CCs on different frequency bands will experience different pathloss. A primary service cell or PCell may provide a primary component carrier (PCC) for both UL and DL, and may handle radio resource control (RRC) and non-access stratum (NAS) related activities. The other serving cells are referred to as SCells, and each SCell may provide an individual secondary component carrier (SCC) for both UL and DL. The SCCs may be added and removed as required, while changing the PCC may require UE 110 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH may carry user data and higher layer signaling to UEs 110. The physical downlink control channel (PDCCH) may carry information about the transport format and resource allocations related to the PDSCH channel, among other things. The PDCCH may also inform UEs 110 about the transport format, resource allocation, and hybrid automatic repeat request (HARQ) information related to the uplink shared channel. Typically, downlink scheduling (e.g., assigning control and shared channel resource blocks to UE 110-2 within a cell) may be performed at any of the RAN nodes 122 based on channel quality information fed back from any of UEs 110. The downlink resource assignment information may be sent on the PDCCH used for (e.g., assigned to) each of UEs 110.

The PDCCH uses control channel elements (CCEs) to convey the control information, wherein a number of CCEs (e.g., 6 or the like) may consists of a resource element groups (REGs), where a REG is defined as a physical resource block (PRB) in an OFDM symbol. Before being mapped to resource elements, the PDCCH complex-valued symbols may first be organized into quadruplets, which may then be permuted using a sub-block interleaver for rate matching, for example. Each PDCCH may be transmitted using one or more of these CCEs, where each CCE may correspond to nine sets of four physical resource elements known as REGs. Four quadrature phase shift keying (QPSK) symbols may be mapped to each REG. The PDCCH may be transmitted using one or more CCEs, depending on the size of the DCI and the channel condition. There may be four or more different PDCCH formats defined in LTE with different numbers of CCEs (e.g., aggregation level, L=1, 2, 4, 8, or 110).

Some implementations may use concepts for resource allocation for control channel information that are an extension of the above-described concepts. For example, some implementations may utilize an extended (E)-PDCCH that uses PDSCH resources for control information transmission. The EPDCCH may be transmitted using one or more ECCEs. Similar to the above, each ECCE may correspond to nine sets of four physical resource elements known as an EREGs. An ECCE may have other numbers of EREGs in some situations.

The RAN nodes 122 may be configured to communicate with one another via interface 123. In implementations where example network 100 is an LTE system, interface 123 may be an X2 interface. The X2 interface may be defined between two or more RAN nodes 122 (e.g., two or more eNBs/gNBs or a combination thereof) that connect to evolved packet core (EPC) or CN 130, or between two eNBs connecting to an EPC. In some implementations, the X2 interface may include an X2 user plane interface (X2-U) and an X2 control plane interface (X2-C). The X2-U may provide flow control mechanisms for user data packets transferred over the X2 interface and may be used to communicate information about the delivery of user data between eNBs or gNBs. For example, the X2-U may provide specific sequence number information for user data transferred from a master eNB (MeNB) to a secondary eNB (SeNB); information about successful in sequence delivery of PDCP packet data units (PDUs) to a UE 110 from an SeNB for user data; information of PDCP PDUs that were not delivered to a UE 110; information about a current minimum desired buffer size at the SeNB for transmitting to the UE user data; and the like. The X2-C may provide intra-LTE access mobility functionality (e.g., including context transfers from source to target eNBs, user plane transport control, etc.), load management functionality, and inter-cell interference coordination functionality.

As shown, RAN 120 may be connected (e.g., communicatively coupled) to CN 130. CN 130 may comprise a plurality of network elements 132, which are configured to offer various data and telecommunications services to customers/subscribers (e.g., users of UEs 110) who are connected to the CN 130 via the RAN 120. In some implementations, CN 130 may include an evolved packet core (EPC), a 5G CN, and/or one or more additional or alternative types of CNs. The components of the CN 130 may be implemented in one physical node or separate physical nodes including components to read and execute instructions from a machine-readable or computer-readable medium (e.g., a non-transitory machine-readable storage medium). In some implementations, network function virtualization (NFV) may be utilized to virtualize any or all the above-described network node roles or functions via executable instructions stored in one or more computer-readable storage mediums (described in further detail below). A logical instantiation of the CN 130 may be referred to as a network slice, and a logical instantiation of a portion of the CN 130 may be referred to as a network sub-slice. Network Function Virtualization (NFV) architectures and infrastructures may be used to virtualize one or more network functions, alternatively performed by proprietary hardware, onto physical resources comprising a combination of industry-standard server hardware, storage hardware, or switches. In other words, NFV systems may be used to execute virtual or reconfigurable implementations of one or more EPC components/functions.

As shown, CN 130, application servers (ASs) 140, and external networks 150 may be connected to one another via interfaces 134, 136, and 138, which may include IP network interfaces. Application servers 140 may include one or more server devices or network elements (e.g., virtual network functions (VNFs) offering applications that use IP bearer resources with CN 130 (e.g., universal mobile telecommunications system packet services (UMTS PS) domain, LTE PS data services, etc.). Application server 140 may also, or alternatively, be configured to support one or more communication services (e.g., voice over IP (VoIP sessions, push-to-talk (PTT) sessions, group communication sessions, social networking services, etc.) for UEs 110 via the CN 130. Similarly, external networks 150 may include one or more of a variety of networks, including the Internet, thereby providing the mobile communication network and UEs 110 of the network access to a variety of additional services, information, interconnectivity, and other network features.

As shown, example network 100 may include an NTN that may comprise one or more satellites 160-1 and 160-2 (collectively, "satellites 160"). Satellites 160 may be in communication with UEs 110 via service link or wireless interface 162 and/or RAN 120 via feeder links or wireless interfaces 164 (depicted individually as 164-1 and 164). In some implementations, satellite 160 may operate as a passive or transparent network relay node regarding communications between UE 110 and the terrestrial network (e.g., RAN 120). In some implementations, satellite 160 may operate as an active or regenerative network node such that satellite 160 may operate as a base station to UEs 110 (e.g., as a gNB of RAN 120) regarding communications between UE 110 and RAN 120. In some implementations, satellites 160 may communicate with one another via a direct wireless interface (e.g., 166) or an indirect wireless interface (e.g., via RAN 120 using interfaces 164-1 and 164-2). Additionally, or alternatively, satellite 160 may include a GEO satellite, LEO satellite, or another type of satellite. Satellite 160 may also, or alternatively pertain to one or more satellite systems or architectures, such as a global navigation satellite system (GNSS), global positioning system (GPS), global navigation satellite system (GLONASS), BeiDou navigation satellite system (BDS), etc. In some implementations, satellites 160 may operate as bases stations (e.g., RAN nodes 122) with respect to UEs 110. As such, references herein to a base station, RAN node 122, etc., may involve implementations where the base station, RAN node 122, etc., is a terrestrial network node and implementation, where the base station, RAN node 122, etc., is a non-terrestrial network node (e.g., satellite 160).

Figure 2:
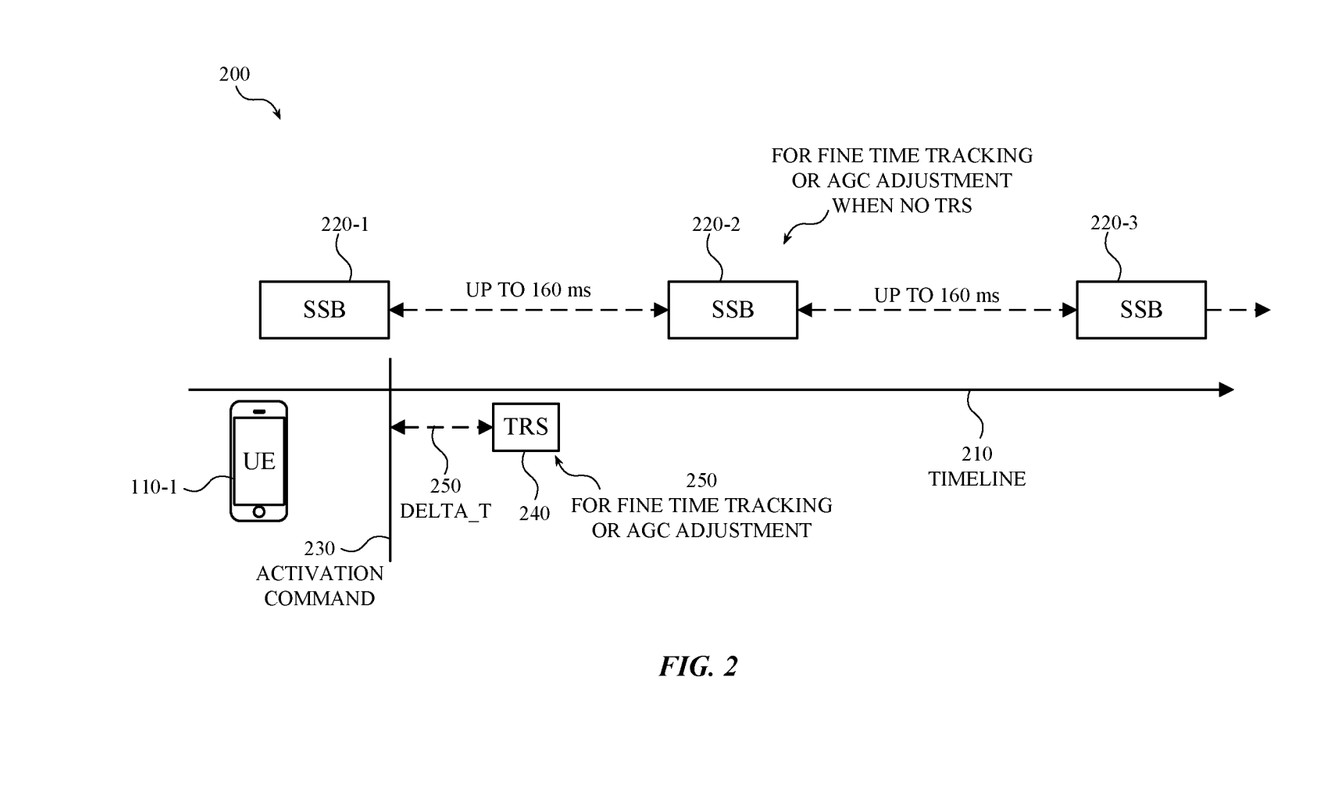
FIG. 2 is a timeline diagram of example of secondary cell activation using a user equipment (UE) specific reference signal (RS).

FIG. 2 is a timeline diagram of example 200 of secondary cell activation using a UE-specific RS. As shown, example 200 includes timeline 210 and corresponding SSB 220-1, 220-2, . . . , SSB 220-3 (referred to collectively as "SSBs 220"). UE 110-1 may receive and process an activation command at 230, which is subsequent to SSB 220-1. In implementations where the network has not configured a TRS (e.g., the PCell has not provided UE 110-1 with a TRS configuration of the SCell), UE 110-1 may perform fine time tracking based on the first complete SSB 220-2, of the corresponding TCI state, received by UE 110-1.

By contrast, in implementations where the network has configured a TRS (e.g., the PCell has provided UE 110-1 with a TRS configuration of the SCell), UE 110-1 may perform fine time tracking based on the TRS 240 from the SCell. As described herein, The TRS configuration may be periodic or aperiodic. In example, 200, if the TRS configuration is periodic, DELTA_T 250 (e.g., Time_FineTiming) is the periodicity of the TRS configuration. By contrast, if the TRS configuration is aperiodic, DELTA_T 250 (e.g., Time_FineTiming) may be a duration of time between the UE finishing with processing a last activation command for PDCCH TCI, PDSCH TCI (when applicable) and a timing of a first complete available TRS 240. As such, the techniques described herein enable fine time tracking to occur based on an SSB, periodic TRS, or aperiodic TRS.

Figure 3:
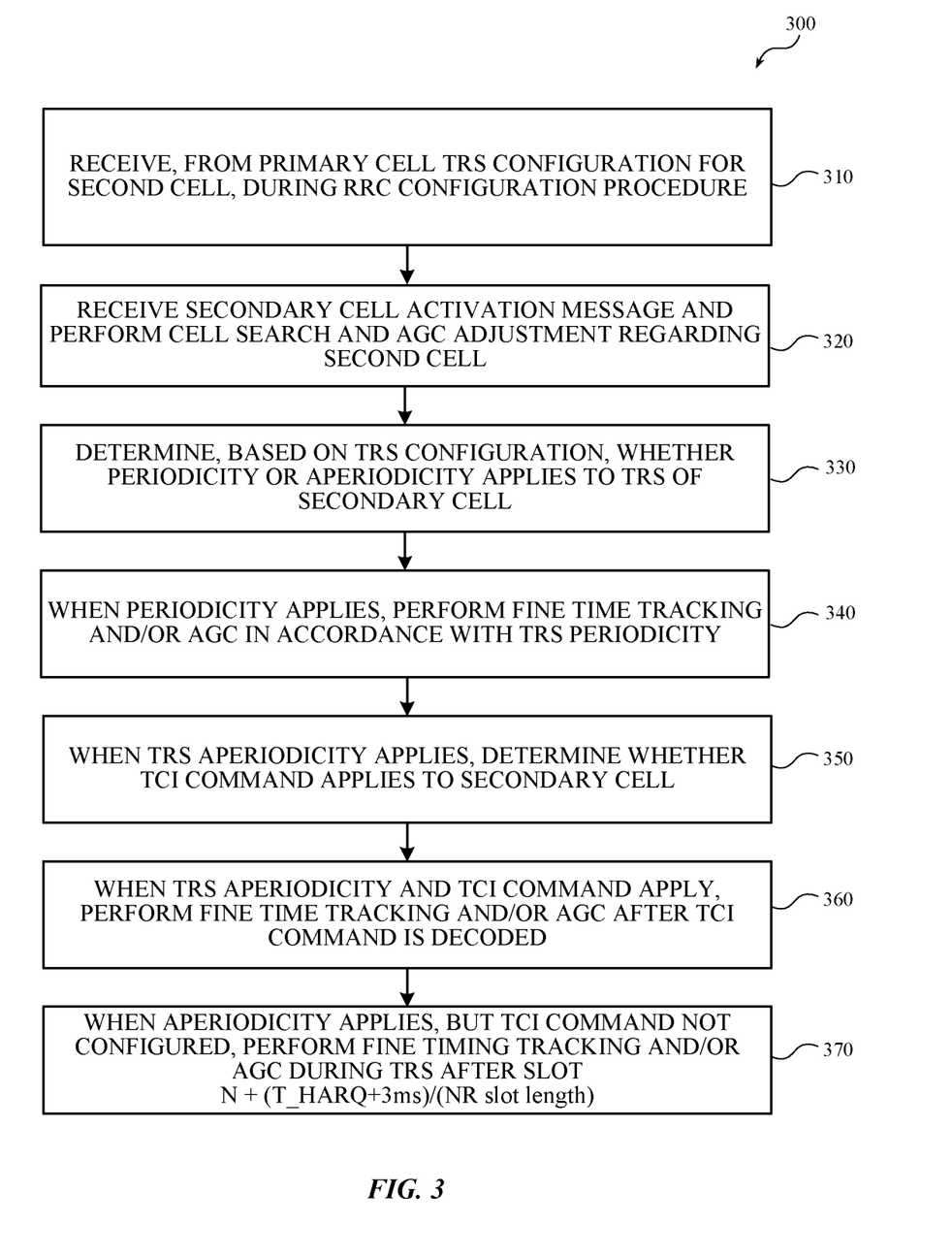
FIG. 3 is a flowchart of an example process for activating a secondary sell using a UE-specific RS.

FIG. 3 is a flowchart of an example process 300 for activating a secondary cell using a UE-specific RS. Process 300 may be implemented by UE 110. In some implementations, some or all of process 300 may be performed by one or more other systems or devices, including one or more of the devices of FIG. 1. Additionally, process 300 may include one or more fewer, additional, differently ordered and/or arranged operations than those shown in FIG. 3. Furthermore, as FIG. 3 and the corresponding description discuss an example process 300 for activating a secondary cell that may be performed by UE 110, the scope of the techniques described herein include corresponding processes that may performed by a corresponding base station (e.g., RAN node 112), satellite, and/or other network device described in reference to FIG. 1.

As shown, process 300 may include receiving, from a PCell, a TRS configuration for a SCell during RRC configuration procedure (block 310). For example, a base station operating as a PCell for UE 110 may provide UE 110 a TRS configuration for another base station intended to operate as a SCell fur UE 110. As described herein, the TRS configuration may include a TRS during which UE 110 may synchronize (e.g., perform fine time tracking) with the SCell based on a UE-specific RS. In some implementations, UE 110 may also receive other types of configuration information, such as SMTC information, TCI information, etc., regarding the SCell. In some implementations, UE 110 may receive another MAC command or DCI message indicating a TRS configuration (e.g., a TRS transmission). In some implementations, when a TRS configuration is not provided, UE 110 may receive SMTC and/or TCI for the SCell and perform fine time tracking based on an SSB the SCell.

Process 300 may also include receiving a SCell activation message and performing a cell search and ADC regarding the SCell (block 320). For example, UE 110 may receive, from the PCell, an MAC CE that includes an activation command for the SCell. In some implementations, the activation command may correspond to a carrier on the SCell. The carrier on the SCell may be part of a CA configuration (that may include one or more carriers of the PCell) for UE 110. In response to the activation command, UE 110 may perform a cell search and AGC regarding the SCell.

Process 300 may include determining, based on the TRS configuration, whether periodicity or aperiodicity applies to the TRS of the SCell (block 330). For example, UE 110 may determine, based on the TRS configuration received from the PCell, whether the SCell implements periodicity or aperiodicity regarding the TRS. UE 110 may also, or alternatively, determine based on the TRS configuration a transmission time of the TRS.

Process 300 may include, when periodicity applies to the TRS, performing fine time tracking and/or AGC in accordance with the TRS periodicity (block 340). For example, UE 110 may perform fine time tracking and/or AGC based on the periodicity of the TRS. As described herein, when UE 110 performs fine time tracking and/or AGC based on the periodicity of the TRS, Time_FineTiming may be equal to a periodicity of the PRS.

Process 300 may include, when aperiodicity applies, determining whether a TCI command is configured for the SCell (block 350). For example, when aperiodicity applies to the TRS, UE 110 may determine whether a TCI command has been configured for the SCell. In some implementations, TCI states may be provided to UE 110 as part of the RRC configuration procedure, the PCell may send a TCI command to UE 110 in a MAC CE (which may be the same or different MAC CE of the SCell activation command.

Process 300 may also include, when TRS aperiodicity and a TCI configuration applies to the SCell activation, performing fine time tracking and/or AGC after the TCI command is decoded (block 360). For example, when TRS aperiodicity is used by SCell, UE 110 may determine whether a TCI command has been received, with respect to the SCell activation, and if so, perform fine time tracking during the TRS after the TCI command is decoded by UE 110.

Process 300 may include, when TRS aperiodicity applies, but a TCI command is not configured, performing fine time tracking and/or AGC during TRS after slot N+(T_HARQ+3 ms)/(NR slot length) (block 370). For example, when UE 110 determines that TRS aperiodicity applies but a TCI command is not configured for the SCell activation, UE 110 may perform fine time tracking during a TRS occurring after a slot N+(T_HARQ+3 ms)/(NR slot length).

Figure 4:
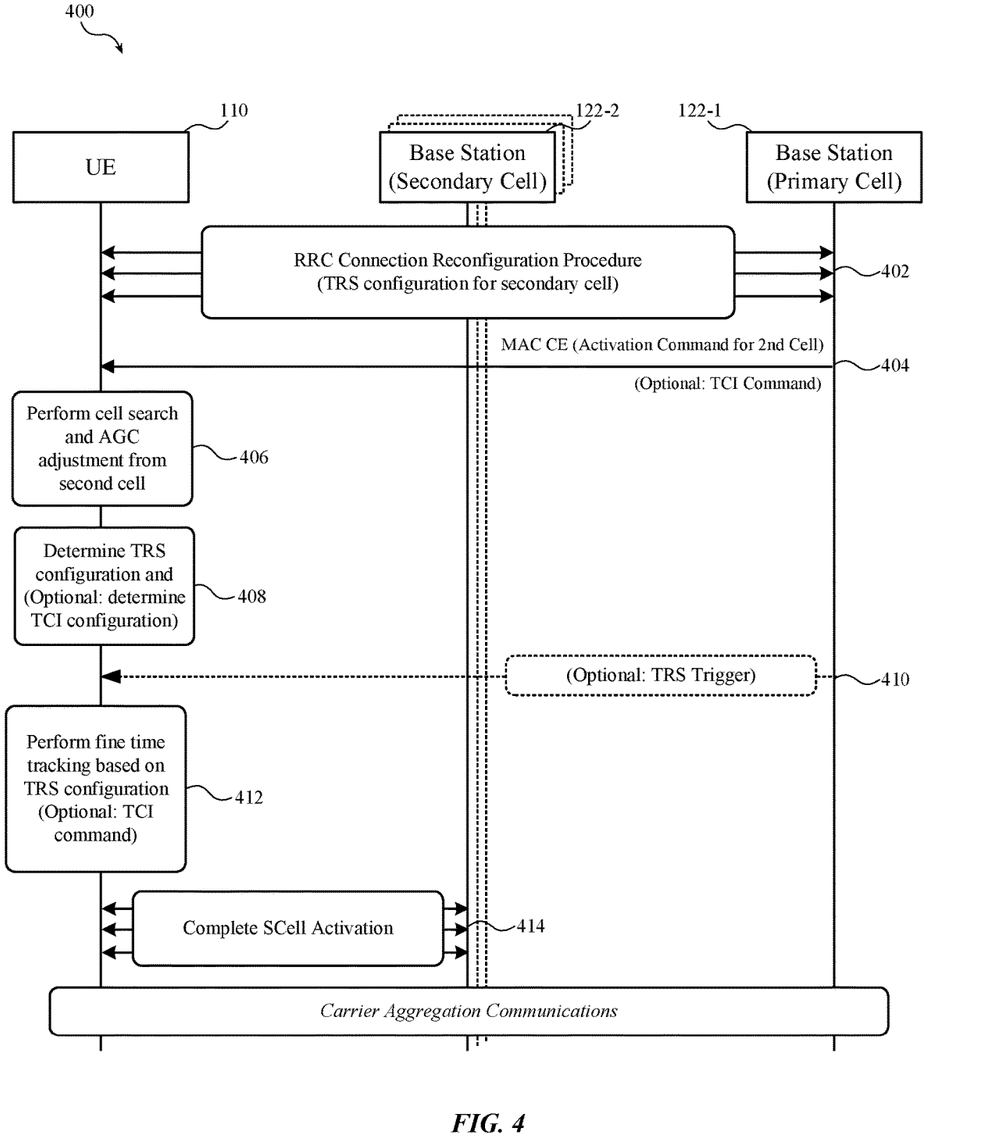
FIG. 4 is a sequence diagrams of an example process activating a secondary sell using a UE-specific RS.

FIG. 4 is a sequence diagrams of an example process 400 activating a secondary sell using a UE-specific RS. As shown, example process 400 may involve UE 110, base station 122-1 (operating as a PCell to UE 110), and base station 122-2 (operating as an SCell for UE 110). In some implementations, example process 400 may include one or more additional, alternative, fewer, or differently arranged operations, and/or devices, than those shown in FIG. 4. Additionally, while the operations of FIG. 4 are depicted as being performed by UE 110, base station 122-1, and base station 122-2, in some implementations, one or more of the operations may be performed by another device, or combination of devices, of a wireless communication network.

As shown, base station 122-1 and UE 110 may engage in a RRC procedure, such as a RRC connection reconfiguration procedure (at 402). During the procedure, base station 122-1 may provide UE 110 with a TRS configuration for a SCell (e.g., base station 122-2). At some point, base station 122-1 may send a MAC CE to UE 110, which may include a command for activating base station 122-2 as an SCell for UE 110 (at 404). The activation command may include a TRS configuration of base station 122-2. In some implementations, the MAC CE may also include a TCI command, or another type of TCI, of base station 122-2. In some implementations, the TCI command may be sent in a different MAC CE. In yet other implementations, no TCI command may be sent.

In response to the activation command, UE 110 may initiate perform a cell search and AGC adjustments regarding base station 122-2 (at 406). Additionally, UE 110 may determine a TRS configuration of base station 122-2 (at 408). The TRS configuration may indicate a UE-specific RS that UE 110 may use to synchronize (e.g., perform fine time tracking) regarding base station 122-2. In some implementations, this may include UE 110 determining whether the TRS of base station 122-2 is periodic or aperiodic. In some implementations, such as scenarios in which a TCI command is sent, UE 110 may also determine a TCI configuration of base station 122-2. In some implementations, base station 122-1 may communicate a TRS trigger to UE 110, which may cause or prompt UE 110 regarding the TRS (e.g., to begin performing fine time tracking during the TRS) (at 410). In some implementations, the TRS trigger may be part of a MAC command In some implementations, the TRS may be part of DCI. In some implementations, the PCell may communicate the TRS trigger at another time, such as prior to, or concurrent with, UE 110 determining the TRS configuration.

As shown, UE 110 may perform fine time tracking based on the TRS configuration for base station 122-2. As described above, this may depend, in part, on whether the TRS is periodic or aperiodic. Also as described herein, in some implementations, the fine time tracking may also be based on a TCI configuration of base station 122-2 and when UE 110 processes the TCI command UE 110 may continue by completing SCell activation regarding base station 122-2, which may later result in a CA scenario involving UE 110, base station 122-1, and base station 122-2.

Figure 5:
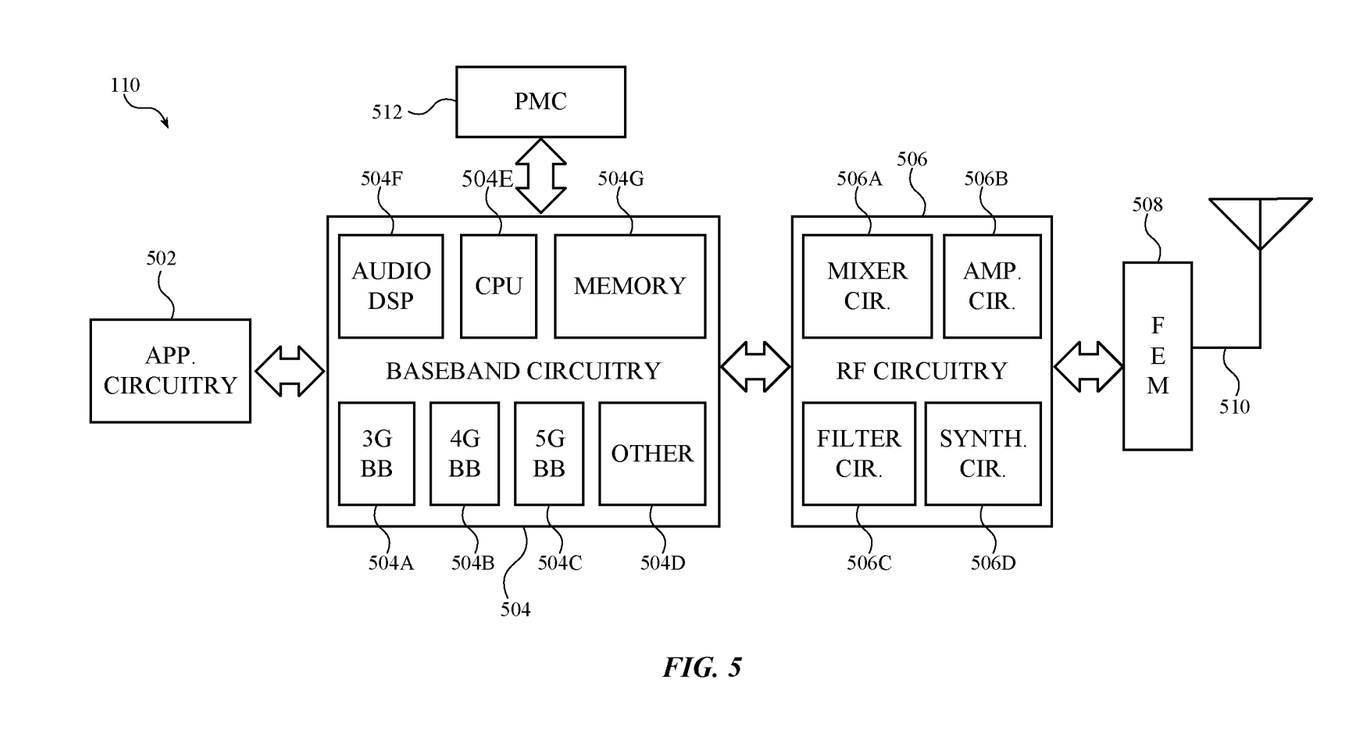
FIG. 5 is a diagram of an example of components of a device according to one or more implementations described herein.

FIG. 5 is a diagram of an example of components of a device according to one or more implementations described herein. In some implementations, the device 500 can include application circuitry 502, baseband circuitry 504, Radio Frequency (RF) circuitry 506, front-end module (FEM) circuitry 508, one or more antennas 56, and power management circuitry (PMC) 512 coupled together at least as shown. The components of the illustrated device 500 can be included in a UE or a RAN node. In some implementations, the device 500 can include fewer elements (e.g., a RAN node may not utilize application circuitry 502, and instead include a processor/controller to process IP data received from a CN such as 5GC 130 or an Evolved Packet Core (EPC)). In some implementations, the device 500 can include additional elements such as, for example, memory/storage, display, camera, sensor (including one or more temperature sensors, such as a single temperature sensor, a plurality of temperature sensors at different locations in device 500, etc.), or input/output (I/O) interface. In other implementations, the components described below can be included in more than one device (e.g., said circuitries can be separately included in more than one device for Cloud-RAN (C-RAN) implementations).

The application circuitry 502 can include one or more application processors. For example, the application circuitry 502 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 500. In some implementations, processors of application circuitry 502 can process IP data packets received from an EPC.

The baseband circuitry 504 can include circuitry such as, but not limited to, one or more single-core or multi-core processors. The baseband circuitry 504 can include one or more baseband processors or control logic to process baseband signals received from a receive signal path of the RF circuitry 506 and to generate baseband signals for a transmit signal path of the RF circuitry 506. Baseband processing circuity 504 can interface with the application circuitry 502 for generation and processing of the baseband signals and for controlling operations of the RF circuitry 506. For example, in some implementations, the baseband circuitry 504 can include a third generation (3G) baseband processor 504A, a fourth generation (4G) baseband processor 504B, a fifth generation (5G) baseband processor 504C, or other baseband processor(s) 504D for other existing generations, generations in development or to be developed in the future (e.g., second generation (2G), sixth generation (6G), etc.). The baseband circuitry 504 (e.g., one or more of baseband processors 504A-D) can handle various radio control functions that enable communication with one or more radio networks via the RF circuitry 506. In other implementations, some or all of the functionality of baseband processors 504A-D can be included in modules stored in the memory 504G and executed via a Central Processing Unit (CPU) 504E. The radio control functions can include, but are not limited to, signal modulation/demodulation, encoding/decoding, radio frequency shifting, etc. In some implementations, modulation/demodulation circuitry of the baseband circuitry 504 can include Fast-Fourier Transform (FFT), preceding, or constellation mapping/demapping functionality. In some implementations, encoding/decoding circuitry of the baseband circuitry 504 can include convolution, tail-biting convolution, turbo, Viterbi, or Low Density Parity Check (LDPC) encoder/decoder functionality. Implementations of modulation/demodulation and encoder/decoder functionality are not limited to these examples and can include other suitable functionality in other implementations.

In some implementations, the baseband circuitry 504 can include one or more audio digital signal processor(s) (DSP) 504F. The audio DSP(s) 504F can include elements for compression/decompression and echo cancellation and can include other suitable processing elements in other implementations. Components of the baseband circuitry can be suitably combined in a single chip, a single chipset, or disposed on a same circuit board in some implementations. In some implementations, some or all of the constituent components of the baseband circuitry 504 and the application circuitry 502 can be implemented together such as, for example, on a system on a chip (SOC).

In some implementations, the baseband circuitry 504 can provide for communication compatible with one or more radio technologies. For example, in some implementations, the baseband circuitry 504 can support communication with a NG-RAN, an evolved universal terrestrial radio access network (EUTRAN) or other wireless metropolitan area networks (WMAN), a wireless local area network (WLAN), a wireless personal area network (WPAN), etc. Implementations in which the baseband circuitry 504 is configured to support radio communications of more than one wireless protocol can be referred to as multi-mode baseband circuitry.

RF circuitry 506 can enable communication with wireless networks using modulated electromagnetic radiation through a non-solid medium. In various implementations, the RF circuitry 506 can include switches, filters, amplifiers, etc. to facilitate the communication with the wireless network. RF circuitry 506 can include a receive signal path which can include circuitry to down-convert RF signals received from the FEM circuitry 508 and provide baseband signals to the baseband circuitry 504. RF circuitry 506 can also include a transmit signal path which can include circuitry to up-convert baseband signals provided by the baseband circuitry 504 and provide RF output signals to the FEM circuitry 508 for transmission.

In some implementations, the receive signal path of the RF circuitry 506 can include mixer circuitry 506a, amplifier circuitry 506b and filter circuitry 506c. In some implementations, the transmit signal path of the RF circuitry 506 can include filter circuitry 506c and mixer circuitry 506a. RF circuitry 506 can also include synthesizer circuitry 506d for synthesizing a frequency for use by the mixer circuitry 506a of the receive signal path and the transmit signal path. In some implementations, the mixer circuitry 506a of the receive signal path can be configured to down-convert RF signals received from the FEM circuitry 508 based on the synthesized frequency provided by synthesizer circuitry 506d. The amplifier circuitry 506b can be configured to amplify the down-converted signals and the filter circuitry 506c can be a low-pass filter (LPF) or band-pass filter (BPF) configured to remove unwanted signals from the down-converted signals to generate output baseband signals. Output baseband signals can be provided to the baseband circuitry 504 for further processing. In some implementations, the output baseband signals can be zero-frequency baseband signals, although this is not a requirement. In some implementations, mixer circuitry 506a of the receive signal path can comprise passive mixers, although the scope of the implementations is not limited in this respect.

In some implementations, the mixer circuitry 506a of the transmit signal path can be configured to up-convert input baseband signals based on the synthesized frequency provided by the synthesizer circuitry 506d to generate RF output signals for the FEM circuitry 508. The baseband signals can be provided by the baseband circuitry 504 and can be filtered by filter circuitry 506c.

In some implementations, the mixer circuitry 506a of the receive signal path and the mixer circuitry 506a of the transmit signal path can include two or more mixers and can be arranged for quadrature downconversion and upconversion, respectively. In some implementations, the mixer circuitry 506a of the receive signal path and the mixer circuitry 506a of the transmit signal path can include two or more mixers and can be arranged for image rejection (e.g., Hartley image rejection). In some implementations, the mixer circuitry 506a of the receive signal path and the mixer circuitry 506a can be arranged for direct downconversion and direct upconversion, respectively. In some implementations, the mixer circuitry 506a of the receive signal path and the mixer circuitry 506a of the transmit signal path can be configured for super-heterodyne operation.

In some implementations, the output baseband signals and the input baseband signals can be analog baseband signals, although the scope of the implementations is not limited in this respect. In some alternate implementations, the output baseband signals and the input baseband signals can be digital baseband signals. In these alternate implementations, the RF circuitry 506 can include analog-to-digital converter (ADC) and digital-to-analog converter (DAC) circuitry and the baseband circuitry 504 can include a digital baseband interface to communicate with the RF circuitry 506.

In some dual-mode implementations, a separate radio IC circuitry can be provided for processing signals for each spectrum, although the scope of the implementations is not limited in this respect.

In some implementations, the synthesizer circuitry 506d can be a fractional-N synthesizer or a fractional N/N+1 synthesizer, although the scope of the implementations is not limited in this respect as other types of frequency synthesizers can be suitable. For example, synthesizer circuitry 506d can be a delta-sigma synthesizer, a frequency multiplier, or a synthesizer comprising a phase-locked loop with a frequency divider.

The synthesizer circuitry 506d can be configured to synthesize an output frequency for use by the mixer circuitry 506a of the RF circuitry 506 based on a frequency input and a divider control input. In some implementations, the synthesizer circuitry 506d can be a fractional N/N+1 synthesizer.

In some implementations, frequency input can be provided by a voltage controlled oscillator (VCO), although that is not a requirement. Divider control input can be provided by either the baseband circuitry 504 or the applications processor 502 depending on the desired output frequency. In some implementations, a divider control input (e.g., N) can be determined from a look-up table based on a channel indicated by the applications processor 502.

Synthesizer circuitry 506d of the RF circuitry 506 can include a divider, a delay-locked loop (DLL), a multiplexer and a phase accumulator. In some implementations, the divider can be a dual modulus divider (DMD) and the phase accumulator can be a digital phase accumulator (DPA). In some implementations, the DMD can be configured to divide the input signal by either N or N+1 (e.g., based on a carry out) to provide a fractional division ratio. In some example implementations, the DLL can include a set of cascaded, tunable, delay elements, a phase detector, a charge pump and a D-type flip-flop. In these implementations, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some implementations, synthesizer circuitry 506d can be configured to generate a carrier frequency as the output frequency, while in other implementations, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some implementations, the output frequency can be a LO frequency (fLO). In some implementations, the RF circuitry 506 can include an IQ/polar converter.

FEM circuitry 508 can include a receive signal path which can include circuitry configured to operate on RF signals received from one or more antennas 56, amplify the received signals and provide the amplified versions of the received signals to the RF circuitry 506 for further processing. FEM circuitry 508 can also include a transmit signal path which can include circuitry configured to amplify signals for transmission provided by the RF circuitry 506 for transmission by one or more of the one or more antennas 56. In various implementations, the amplification through the transmit or receive signal paths can be done solely in the RF circuitry 506, solely in the FEM 508, or in both the RF circuitry 506 and the FEM 508.

In some implementations, the FEM circuitry 508 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 506). The transmit signal path of the FEM circuitry 508 can include a power amplifier (PA) to amplify input RF signals (e.g., provided by RF circuitry 506), and one or more filters to generate RF signals for subsequent transmission (e.g., by one or more of the one or more antennas 56).

In some implementations, the PMC 512 can manage power provided to the baseband circuitry 504. In particular, the PMC 512 can control power-source selection, voltage scaling, battery charging, or DC-to-DC conversion. The PMC 512 can often be included when the device 500 is capable of being powered by a battery, for example, when the device is included in a UE. The PMC 512 can increase the power conversion efficiency while providing desirable implementation size and heat dissipation characteristics.

While FIG. 5 shows the PMC 512 coupled only with the baseband circuitry 504. However, in other implementations, the PMC 512 may be additionally or alternatively coupled with, and perform similar power management operations for, other components such as, but not limited to, application circuitry 502, RF circuitry 506, or FEM 508.

In some implementations, the PMC 512 can control, or otherwise be part of, various power saving mechanisms of the device 500. For example, if the device 500 is in an RRC_Connected state, where it is still connected to the RAN node as it expects to receive traffic shortly, then it can enter a state known as Discontinuous Reception Mode (DRX)

after a period of inactivity. During this state, the device 500 can power down for brief intervals of time and thus save power.

If there is no data traffic activity for an extended period of time, then the device 500 can transition off to an RRC_Idle state, where it disconnects from the network and does not perform operations such as channel quality feedback, handover, etc. The device 500 goes into a very low power state and it performs paging where again it periodically wakes up to listen to the network and then powers down again. The device 500 may not receive data in this state; in order to receive data, it can transition back to RRC_Connected state.

An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

Processors of the application circuitry 502 and processors of the baseband circuitry 504 can be used to execute elements of one or more instances of a protocol stack. For example, processors of the baseband circuitry 504, alone or in combination, can be used execute Layer 3, Layer 2, or Layer 1 functionality, while processors of the application circuitry 502 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 6:
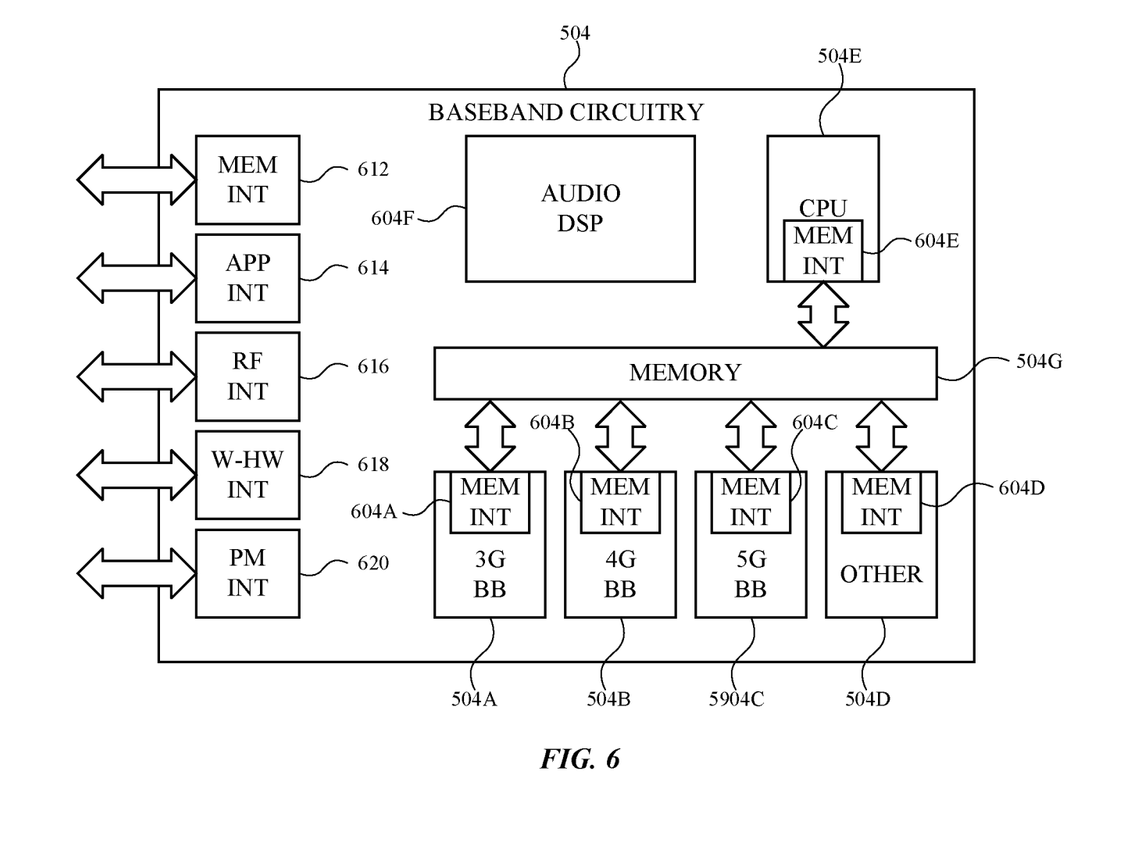
FIG. 6 is a diagram of example interfaces of baseband circuitry according to one or more implementations described herein.

FIG. 6 is a diagram of example interfaces of baseband circuitry according to one or more implementations described herein. As discussed above, the baseband circuitry 504 of FIG. 5 can comprise processors 504A-904E and a memory 504G utilized by said processors. Each of the processors 504A-204E can include a memory interface, 604A-604E, respectively, to send/receive data to/from the memory 504G.

The baseband circuitry 504 can further include one or more interfaces to communicatively couple to other circuitries/devices, such as a memory interface 612 (e.g., an interface to send/receive data to/from memory external to the baseband circuitry 504), an application circuitry interface 614 (e.g., an interface to send/receive data to/from the application circuitry 502 of FIG. 5), an RF circuitry interface 616 (e.g., an interface to send/receive data to/from RF circuitry 506 of FIG. 5), a wireless hardware connectivity interface 618 (e.g., an interface to send/receive data to/from Near Field Communication (NFC) components, Bluetooth® components (e.g., Bluetooth® Low Energy), Wi-Fi® components, and other communication components), and a power management interface 620 (e.g., an interface to send/receive power or control signals to/from the PMC 512).

Examples herein can include subject matter such as a method, means for performing acts or blocks of the method, at least one machine-readable medium including executable instructions that, when performed by a machine (e.g., a processor (e.g., processor, etc.) with memory, an application-specific integrated circuit (ASIC), a field programmable gate array (FPGA), or the like) cause the machine to perform acts of the method or of an apparatus or system for concurrent communication using multiple communication technologies according to implementations and examples described.

In example 1, a user Equipment (UE) device may comprise radio frequency (RF) circuitry configured to communicate with a wireless communication network; a memory device configured to store instructions; and one or more processors, connected to the RF circuitry and memory device, and configured to perform the instructions to: receive, via the RF circuitry and from a first carrier of a first base station operating as a primary cell for the UE, a tracking reference signal (TRS) configuration indicating a UE-specific reference signal (RS) corresponding to a second carrier of the first base station or a third carrier of a second base station designated to operate as a secondary cell for the UE; receive, via the RF circuitry from the primary cell, an activation command for the secondary cell; and perform, in response to the activation command, a secondary cell activation procedure regarding the second base station, the secondary cell activation procedure including fine time tracking based on the UE-specific RS.

In example 2, the one or more processors is configured to determine, based on the TRS configuration, a periodicity of the UE-specific RS; and perform the fine time tracking in accordance with the periodicity of the UE-specific RS. In example 3, the one or more processors is configured to determine, based on the TRS configuration, that the UE-specific RS is an aperiodic RS; and perform the fine time tracking based on a transmission time of the activation command In example 4, the fine time tracking is performed based on a duration of time associated with a hybrid automatic repeat request (HARQ) message associated with the activation command.

In example 5, the one or more processors is configured to detect a TRS trigger based on a media access control (MAC) command or downlink control information (DCI); and perform the fine time tracking in response to the TRS trigger. In example 6, the one or more processors is configured to determine, based on the TRS configuration, that the UE-specific RS is an aperiodic RS; determine that a transmission configuration indicator (TCI) command has been received; and perform the fine time tracking following a decoding of a transmission configuration indicator (TCI) command In example 7, the one or more processors is configured to perform the fine time tracking and automatic gain control (AGC) during transmission of the UE-specific RS. In example 8, the one or more processors is configured to receive the TRS configuration during a radio resource control (RRC) procedure involving the first base station. In example 9, the one or more processors is configured to perform the fine time tracking based on a cell-specific RS when the TRS configuration is not received.

In example 10, baseband (BB) circuitry, of a User Equipment (UE) device, comprises circuitry to: receive, from a first carrier of a first base station operating as a primary cell for the UE, a tracking reference signal (TRS) configuration indicating a UE-specific reference signal (RS) corresponding to a second carrier of the first base station or a third carrier of a second base station designated to operate as a secondary cell for the UE; receive, from the primary cell, an activation command for the secondary cell; and perform, in response to the activation command, a secondary cell activation procedure regarding the second base station, the secondary cell activation procedure including fine time tracking based on the UE-specific RS. In examples 11-18, the BB circuitry of example 10 being further modified by applying one or more, or any combination, of the device features of examples 2-9 as BB circuitry features of example 10.

In example 19, a method, performed by a User Equipment (UE), may comprise: receiving, from a first carrier of a first base station operating as a primary cell for the UE, a tracking reference signal (TRS) configuration indicating a UE-specific reference signal (RS) corresponding to a second carrier of the first base station or a third carrier of a second base station designated to operate as a secondary cell for the UE; receiving, from the primary cell, an activation command for the secondary cell; and performing, in response to the activation command, a secondary cell activation procedure regarding the second base station, the secondary cell activation procedure including fine time tracking based on the UE-specific RS. In examples 20-27, the method of example 19 being further modified by applying one or more, or any combination, of the features of examples 2-9 as method features of example 19.

As example 28, a user Equipment (UE) device may comprise means for receiving, from a first carrier of a first base station operating as a primary cell for the UE, a tracking reference signal (TRS) configuration indicating a UE-specific reference signal (RS) corresponding to a second carrier of the first base station or a third carrier of a second base station designated to operate as a secondary cell for the UE; means for receiving, from the primary cell, an activation command for the secondary cell; and means for performing, in response to the activation command, a secondary cell activation procedure regarding the second base station, the secondary cell activation procedure including fine time tracking based on the UE-specific RS. In examples 29-36, the UE of example 28 being further modified by applying one or more, or any combination, of the features of examples 2-9 as features (e.g., means for features) of example 28.

In example 37, a computer readable medium comprising instructions that when executed by a processor, cause the processor to: receive, from a first carrier of a first base station operating as a primary cell for the UE, a tracking reference signal (TRS) configuration indicating a UE-specific reference signal (RS) corresponding to a second carrier of the first base station or a third carrier of a second base station designated to operate as a secondary cell for the UE; receive, from the primary cell, an activation command for the secondary cell; and perform, in response to the activation command, a secondary cell activation procedure regarding the second base station, the secondary cell activation procedure including fine time tracking based on the UE-specific RS. In examples 38-45, the computer readable medium of example 37 being further modified by applying one or more, or any combination, of the device features of examples 2-9 as computer readable medium features of example 37.

The above description of illustrated examples, implementations, aspects, etc., of the subject disclosure, including what is described in the Abstract, is not intended to be exhaustive or to limit the disclosed aspects to the precise forms disclosed. While specific examples, implementations, aspects, etc., are described herein for illustrative purposes, various modifications are possible that are considered within the scope of such examples, implementations, aspects, etc., as those skilled in the relevant art can recognize.

In this regard, while the disclosed subject matter has been described in connection with various examples, implementations, aspects, etc., and corresponding Figures, where applicable, it is to be understood that other similar aspects can be used or modifications and additions can be made to the disclosed subject matter for performing the same, similar, alternative, or substitute function of the subject matter without deviating therefrom. Therefore, the disclosed subject matter should not be limited to any single example, implementation, or aspect described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

As used herein, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct or they can be the same, although in some situations the context may indicate that they are distinct or that they are the same.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A User Equipment (UE) device comprising:
radio frequency (RF) circuitry configured to communicate with a wireless communication network;
a memory device configured to store instructions; and
one or more processors, connected to the RF circuitry and memory device, and configured to execute the instructions to:
receive, via the RF circuitry, an activation command corresponding to a secondary cell; and
perform, in response to receiving the activation command, a secondary cell activation for activating the secondary cell by performing a fine time tracking based on a UE-specific reference signal (RS) or a cell-specific RS, wherein the fine time tracking is performed based on the UE-specific RS when a tracking reference signal (TRS) configuration indicating the UE-specific RS is received, and performed based on the cell-specific RS when the TRS configuration is not received.

2. The UE of claim 1, wherein the one or more processors is configured to:
   determine, based on the TRS configuration, a periodicity of the UE-specific RS; and
   perform the fine time tracking in accordance with the periodicity of the UE-specific RS.

3. The UE of claim 1, wherein the one or more processors is configured to:
   determine, based on the TRS configuration, that the UE-specific RS is an aperiodic RS; and
   perform the fine time tracking based on a transmission time of the activation command.

4. The UE of claim 3, wherein the fine time tracking is performed based on a duration of time associated with a hybrid automatic repeat request (HARQ) message associated with the activation command.

5. The UE of claim 1, wherein the one or more processors is configured to:
   detect a TRS trigger based on a media access control (MAC) command or downlink control information (DCI); and
   perform the fine time tracking in response to the TRS trigger.

6. The UE of claim 1, wherein the one or more processors is configured to:
   determine, based on the TRS configuration, that the UE-specific RS is an aperiodic RS;
   determine that a transmission configuration indicator (TCI) command has been received; and
   perform the fine time tracking following a decoding of the transmission configuration indicator (TCI) command.

7. The UE of claim 1, wherein the one or more processors is configured to:
   perform the fine time tracking and an automatic gain control (AGC) during transmission of the UE-specific RS.

8. The UE of claim 1, wherein the one or more processors is configured to:
   receive the TRS configuration during a radio resource control (RRC) procedure involving a first base station.

9. Baseband (BB) circuitry, of a User Equipment (UE) device, comprising circuitry to:
   receive, from a primary cell, an activation command corresponding to a secondary cell; and
   perform, in response to the activation command, a secondary cell activation for activating the secondary cell by performing a fine time tracking based on a UE-specific reference signal (RS) or a cell-specific RS, wherein the fine time tracking is performed based on the UE-specific RS when a tracking reference signal (TRS) configuration indicating the UE-specific RS is received, and performed based on the cell-specific RS when the TRS configuration is not received.

10. The BB circuitry of claim 9, further comprising circuitry to:
    determine, based on the TRS configuration, a periodicity of the UE-specific RS; and
    perform the fine time tracking in accordance with the periodicity of the UE-specific RS.

11. The BB circuitry of claim 9, further comprising circuitry to:
    determine, based on the TRS configuration, that the UE-specific RS is an aperiodic RS; and
    perform the fine time tracking based on a transmission time of the activation command.

12. The BB circuitry of claim 11, wherein the fine time tracking is performed based on a duration of time associated with a hybrid automatic repeat request (HARQ) message associated with the activation command.

13. The BB circuitry of claim 9, further comprising circuitry to:
    detect a TRS trigger based on a media access control (MAC) command or downlink control information (DCI); and
    perform the fine time tracking in response to the TRS trigger.

14. The BB circuitry of claim 9, further comprising circuitry to:
    determine, based on the TRS configuration, that the UE-specific RS is an aperiodic RS;
    determine that a transmission configuration indicator (TCI) command has been received; and
    perform the fine time tracking following a decoding of the transmission configuration indicator (TCI) command.

15. The BB circuitry of claim 9, further comprising circuitry to:
    perform the fine time tracking and an automatic gain control (AGC) during transmission of the UE-specific RS.

16. The BB circuitry of claim 9, further comprising circuitry to:
    receive the TRS configuration during a radio resource control (RRC) procedure involving a first base station.

17. A method, performed by a User Equipment (UE), comprising:
    receiving, from a primary cell, an activation command corresponding to a secondary cell; and
    performing, in response to the activation command, a secondary cell activation for the secondary cell by performing a fine time tracking based on a UE-specific reference signal (RS) or a cell-specific RS, wherein the fine time tracking is performed based on the UE-specific RS when a tracking reference signal (TRS) configuration indicating the UE-specific RS is received, and performed based on the cell-specific RS when the TRS configuration is not received.

18. The method of claim 17, further comprising:
    determining, based on the TRS configuration, a periodicity of the UE-specific RS; and
    performing the fine time tracking in accordance with the periodicity of the UE-specific RS.

* * * * *